US012454381B1

(12) United States Patent
Wu (10) Patent No.: US 12,454,381 B1
(45) Date of Patent: Oct. 28, 2025

(54) SEALING MACHINE WITH NOTCH-CUTTING FUNCTION

(71) Applicant: Tzung-Han Wu, Tainan (TW)

(72) Inventor: Tzung-Han Wu, Tainan (TW)

( * ) Notice: Subject to any disclaimer, the term of this patent is extended or adjusted under 35 U.S.C. 154(b) by 0 days.

(21) Appl. No.: 19/024,199

(22) Filed: Jan. 16, 2025

(30) Foreign Application Priority Data

Apr. 18, 2024 (CN) .......................... 202420812767.3

(51) Int. Cl.
*B65B 61/00* (2006.01)
*B65B 31/04* (2006.01)
*B65B 51/14* (2006.01)
*B65B 51/22* (2006.01)

(52) U.S. Cl.
CPC .......... *B65B 61/005* (2013.01); *B65B 31/048* (2013.01); *B65B 51/146* (2013.01); *B65B 51/22* (2013.01)

(58) Field of Classification Search
None
See application file for complete search history.

(56) References Cited

U.S. PATENT DOCUMENTS 10,926,936 B2 * 2/2021 Kim ....................... B65B 31/024
11,772,333 B2 * 10/2023 Lank .................. B29C 66/7352
53/452

2015/0027089 A1 * 1/2015 Owens ................. B29C 66/861
53/167
2018/0370669 A1 * 12/2018 Xu .......................... B29C 65/02
2020/0299013 A1 * 9/2020 Ye ..................... B29C 66/81821

* cited by examiner

*Primary Examiner* — Tanzim Imam
(74) *Attorney, Agent, or Firm* — Best & Flanagan LLP (57) ABSTRACT

A sealing machine with notch-cutting function is related to provide a frame on the notch-cutting component of the sealing machine. The center of the frame is pivoted with the base via a pivot shaft and has a first end and a second end on the left and right ends. A notch-cutting knife is fixed on the top surface of the first end. A spring having one end is fixed with the frame and the other end is fixed with the base and has a force to push the first end and the notch-cutting knife to move downward. The top wall of the base is configured with a knife dispensing opening at a position corresponding to the notch-cutting knife. The top wall of the base has an opening at a position corresponding to the second end. The bottom surface of the upper cover is protruding downward to form a top rod at a position corresponding to the opening. When the upper cover faces downward to cover the base, the bottom end of the top rod passes through the opening and presses the second end to move downward, thereby the frame taking a pivot shaft as a pivot point to enable the first end and the notch-cutting knife to move upward, and the notch-cutting knife stretches out above the top surface of the base through the knife dispensing opening. Based on the design, when the upper cover of the sealing machine is not closed, the notch-cutting knife is hidden inside the machine body and the operator will not be injured by notch-cutting knife. Therefore, the present invention provides safe use.

5 Claims, 8 Drawing Sheets

SEALING MACHINE WITH NOTCH-CUTTING FUNCTION

BACKGROUND OF THE INVENTION

The present invention relates to a sealing machine, and more particularly to a sealing machine with notch-cutting function.

DESCRIPTION OF THE RELATED ART

Accordingly, a sealing machine is a device used to pack products, such as food, medicines and cosmetics, etc. The sealing machines could be two types, wherein one is the general type sealing machine used to seal packing bags (e.g., plastic bags) and the other one is vacuum sealing machine used to suck out the air inside the packing bag or container of products to form a vacuum environment, thereby using a heat sealing technique to seal the packing bag or container to extend the shelf life of the products and avoid oxidation and bacteria. The vacuum sealing machine is widely used in food industry, pharmaceutical industry and cosmetics industry to effectively protect the quality and safety of products and extend the shelf life and are popular and widely applied by consumers.

In order to tear the sealed packing bag conveniently, some conventional sealing machines will cut out a notch at the bag mouth beyond the packing range of the packing bag after sealing, thereby tearing the bag mouth of the packing bag to take out the products conveniently. However, in the conventional sealing machine with notch-cutting function, the notch-cutting knife used to cut the notch is exposed and during the sealing operation, the exposed notch-cutting knife may easily hurt the user by accident. In view of the above shortcoming in the application of the conventional sealing machine with notch-cutting function, the inventor of the present invention endeavored to improve the design and produced the present invention.

SUMMARY OF THE INVENTION

It is a primary objective of the present invention to provide a notch-cutting knife to cut a notch on the packing bag, wherein the notch-cutting knife is hidden inside the machine body when the upper cover of the sealing machine is not in the cover closed status, so as to provide a sealing machine with notch-cutting function which can be operated more safely.

The primary feature of the present invention is related to the notch-cutting component being configured with a frame inside the base of the sealing machine. The center of the frame is pivoted with the base via a pivotal shaft and the left and right ends have a first end and a second end, a notch-cutting knife is fixed on the top surface of the first end of the frame, a spring with one end fixed with the frame and the other end is fixed with the base, and the spring has a force to push the first end of the frame configured with the notch-cutting knife to move downward. The top wall of the base is configured with a knife dispensing opening at the position corresponding to the notch-cutting knife. The top wall of the base corresponding to the second end of the frame has an opening. The bottom surface of the upper cover of the sealing machine located above the base and at the position corresponding to the opening is protruding downward to form a top rod. When the upper cover is facing downward to close the base, the bottom end of the top rod passes through the opening and presses the second end of the frame to move downward, so that the frame is turned around the pivot shaft and the notch-cutting knife on the first end is lifted to extend out of the top surface of the base via the knife dispensing opening. Thus, at the same time when the upper cover is pressed down to close the base and seal the packing bag, the notch-cutting knife will move up and cut out a notch on the edge of the packing bag beyond the packing range. Based on the above configuration, when the upper cover of the sealing machine is not pressed down, the notch-cutting knife is hidden inside the machine body. Thus, the sealing machine can be operated more safely.

For better understanding of the technical means to accomplish the above object and the effect of the present invention, detailed descriptions are provided below with respect to the following embodiment.

DETAILED DESCRIPTION OF EMBODIMENTS OF THE INVENTION

Figure 1:
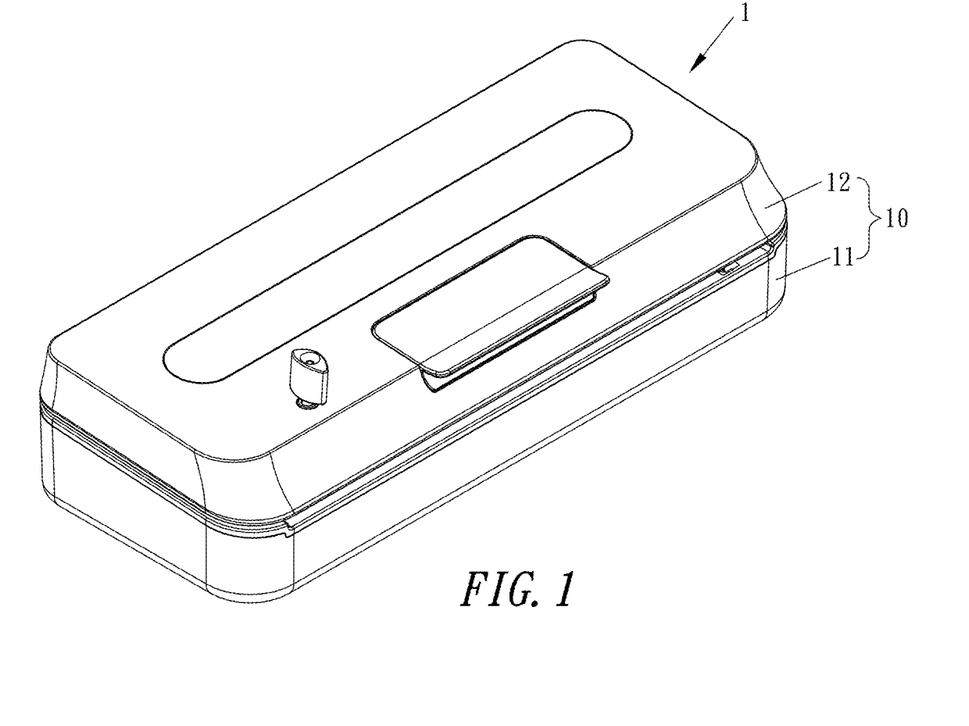
FIG. 1 is a perspective view of overall appearance of an embodiment of the present invention.
Figure 2:
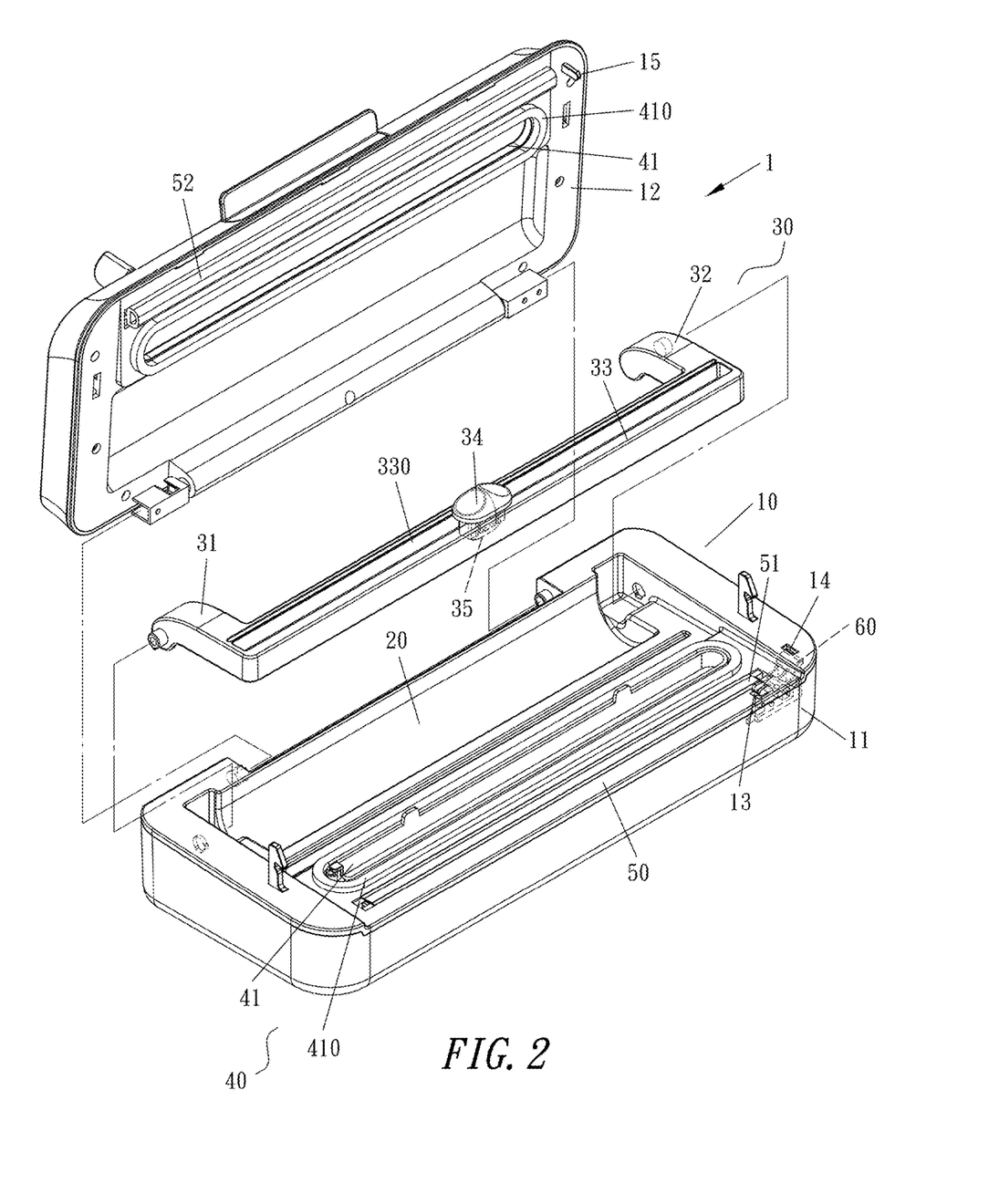
FIG. 2 is an exploded view of an embodiment of the present invention.
Figure 3:
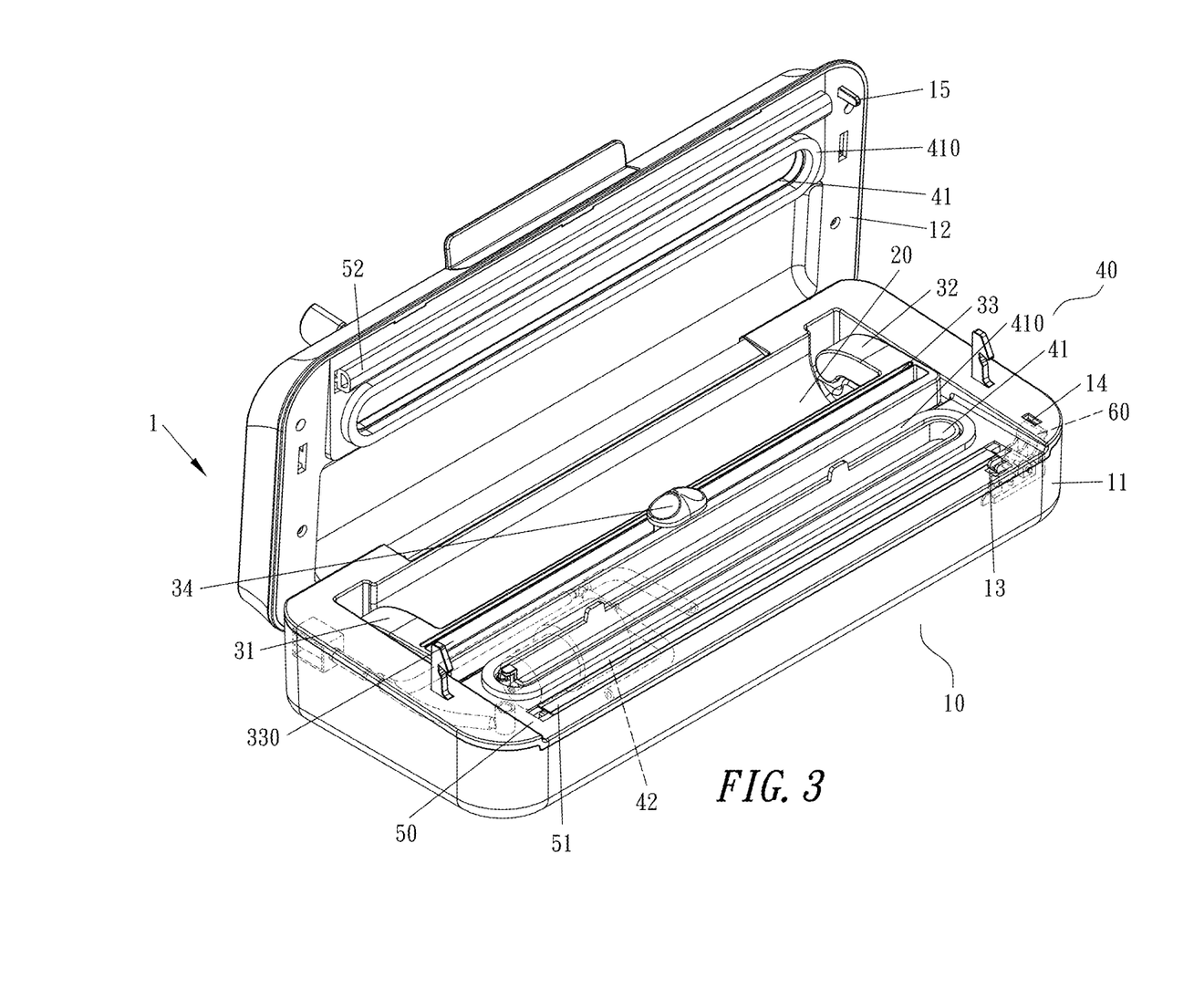
FIG. 3 is a status view an embodiment of the present invention when the upper cover is open.
Figure 4:
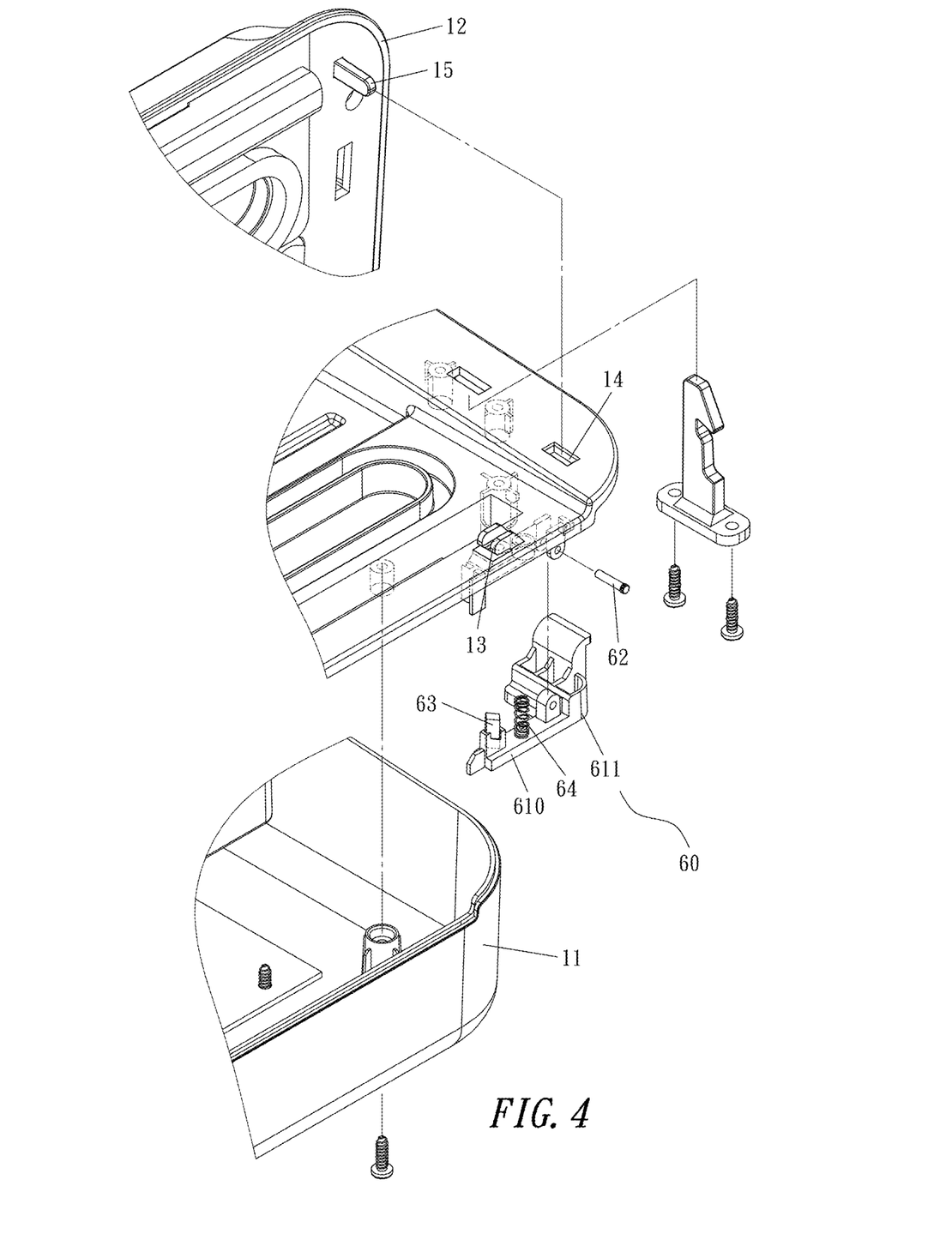
FIG. 4 is an exploded view of the notch-cutting component of an embodiment of the present invention.
Figure 5:
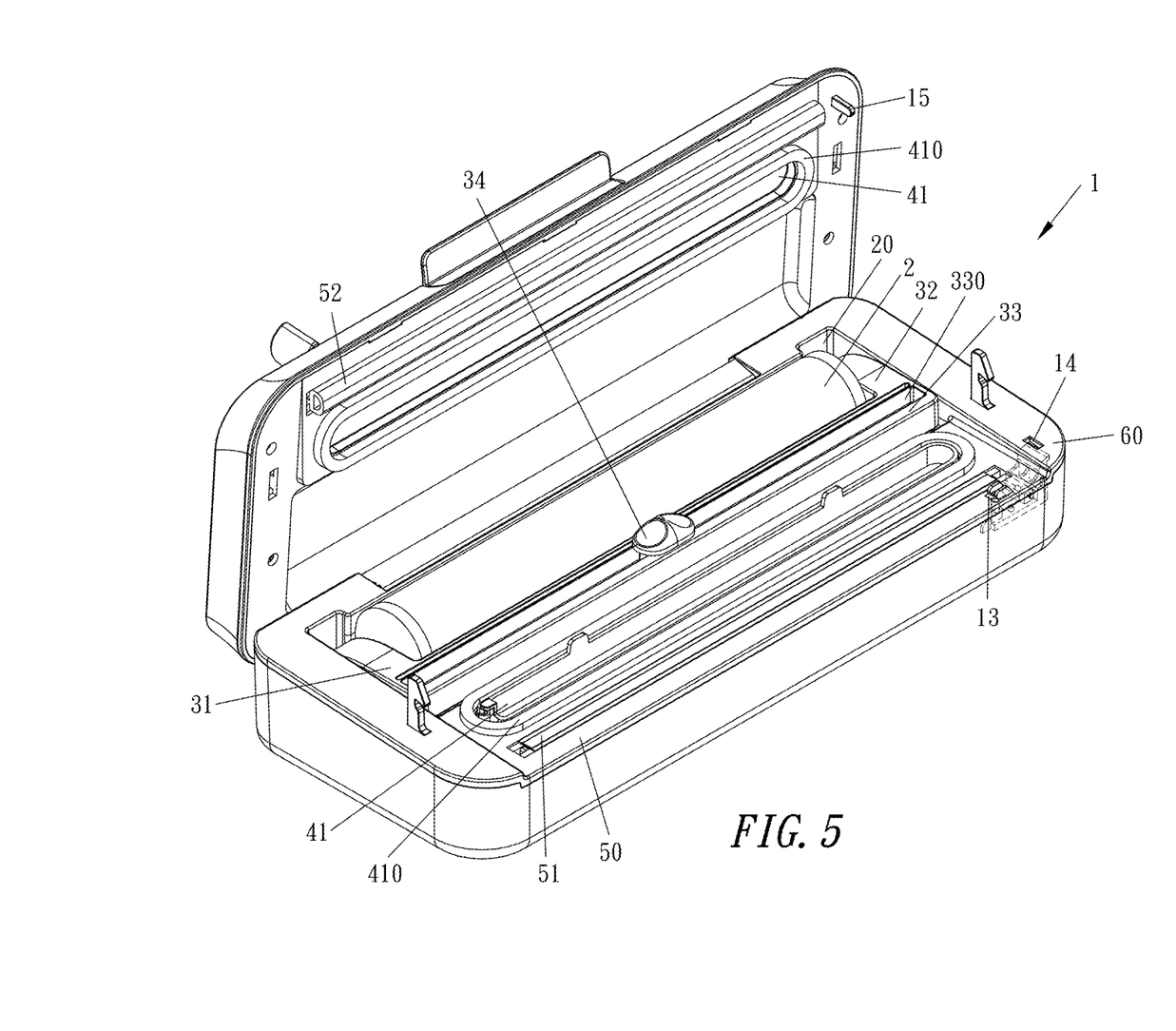
FIG. 5 is a status view of an embodiment of the present invention showing installation of the packing bag roll.
Figure 6:
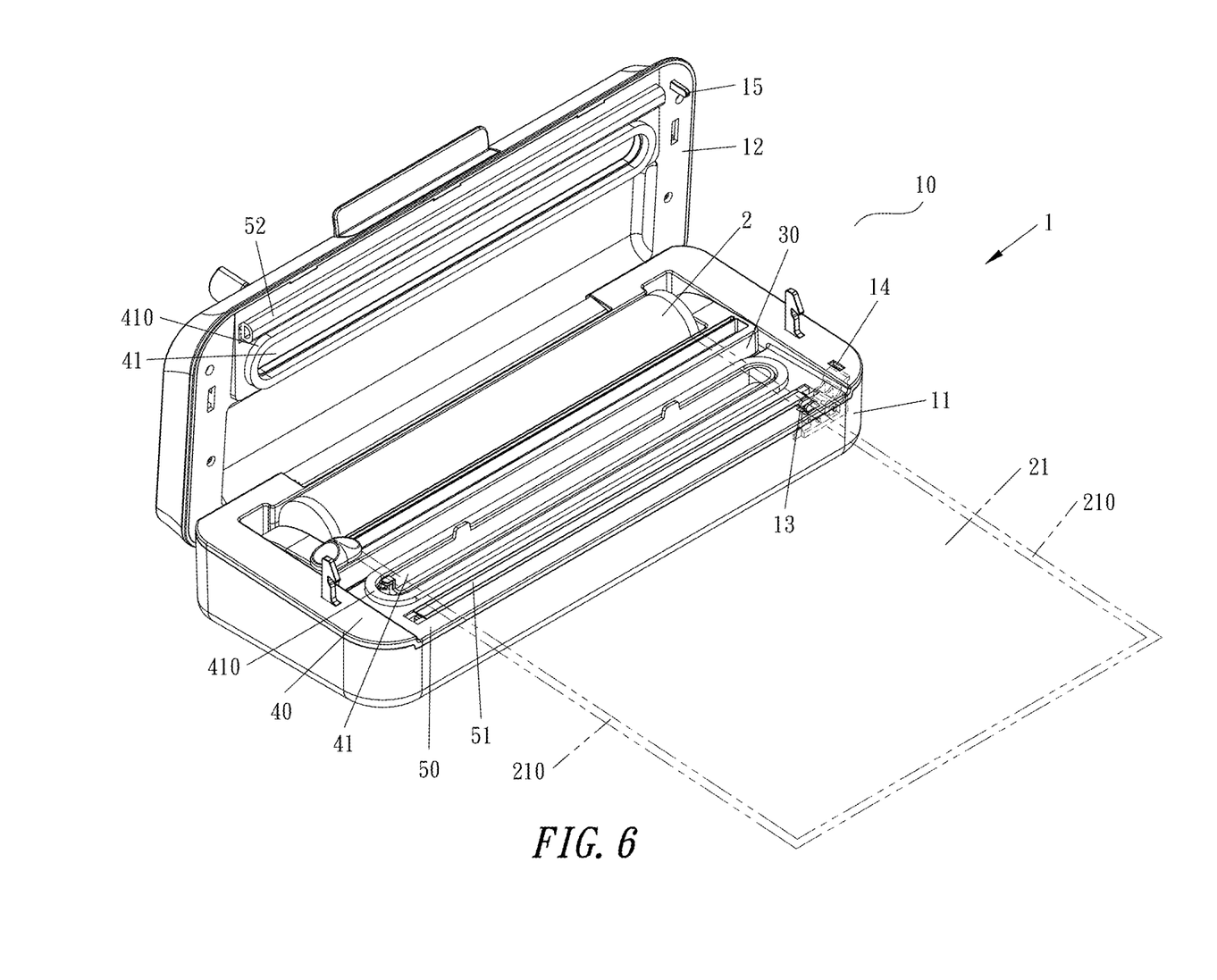
FIG. 6 is a status view of an embodiment of the present invention showing the packing bag being pulled out from under the bag-cutting frame and cut off.
Figure 8:
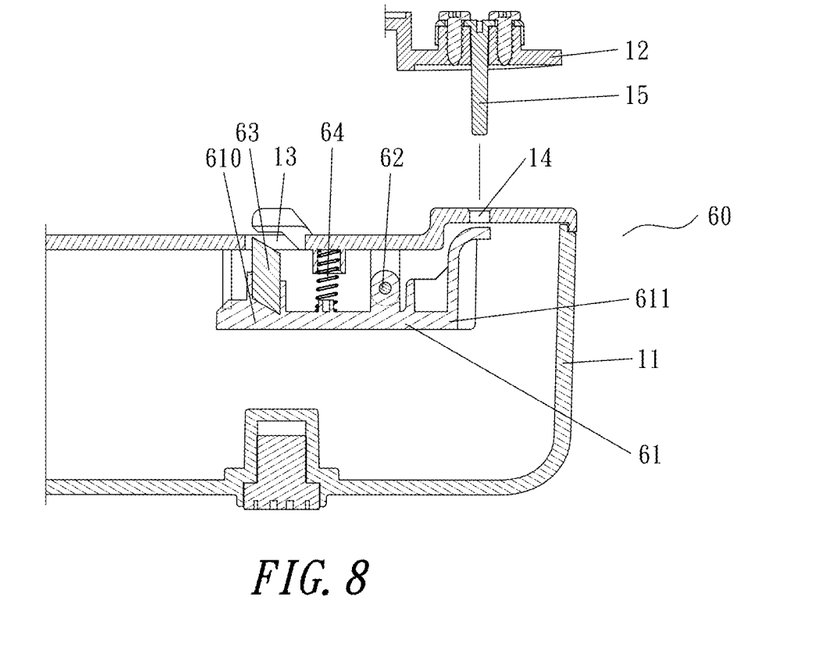
FIG. 8 is a structural view of the notch-cutting component of an embodiment of the present invention before the upper cover is put down.

With reference to FIGS. 2 to 6, the sealing machine 1 is a vacuum sealing machine for example, comprises:

a machine body 10 comprising a base 11 and an upper cover 12 located above the base 11 and one end being pivoted with the base 11, and the upper cover 12 being able to close the base 11;

a placing groove 20 (as shown in FIGS. 2 and 5) configured on the base 11 near to the pivoting position with the upper cover 12, thereby proving the placement of the packing bag roll 2 of the packing bag 21 with the left and right ends having edges 210 (as shown in FIG. 6);

a bag-cutting frame 30 (as shown in FIG. 2) pivoting with the left and right groove walls of the placing groove 20 via the left arm 31 and right arm 32 of the left and right ends. A connecting arm 33 is configured between the left arm 31 and the right arm 32, the center of the connecting arm 33 is configured with a sliding slot 330 with an open shape for embedding a sliding block 34 and the sliding block 34 can slide left and right along the sliding slot 330. The bottom surface of the sliding block 34 is configured with a cutter 35. When a packing bag 21 is ready to be filled with a product, the end part of the packing bag roll 2 can be pulled outward from the placing groove 20, and the bag-cutting frame 30 is lifted to enable the end part of the packing bag 21 to pass the lower end of the bag-cutting frame 30 and pull out for a desired length. Afterwards, the bag-cutting frame 30 is pressed down and the sliding block 34 is activated to drive the cutter 35 to cut, so that the packing bag 21 can be separated from the packing bag roll 2 and be filled with a product;

a vacuum pumping component 40 (as shown in FIGS. 2 to 3) respectively configured with a vacuum pumping slot 41 at the position corresponding to the top surface of the base 11 and the bottom surface of the upper cover 12. The periphery of the vacuum pumping slot 41 is configured with a seal ring 410, so that the vacuum pumping slot 41 forms a sealed space after the upper cover 12 and the base 11 are closed. A vacuum pump 42 (as shown in FIG. 3) is defined inside the base 11 and has a suction opening connected with the vacuum pumping slot 41. After starting, the vacuum pump 42 can suck air out of the opening of the packing bag 21 placed inside the vacuum pumping chute 41, so that a vacuum environment is formed inside the packing bag 21 filled with products;

a sealing component 50 (as shown in FIGS. 2 to 3) is defined on the top surface of the base 11 at a position corresponding to the lifting end of the upper cover 12. The top surface of the base 11 is configured with an electric heating strip 51 which can set up a temperature after starting. The bottom surface of the upper cover 12 is configured with a pressing strip 52 at the position corresponding to the electric heating strip 51. The pressing strip 52 can be pressed and connected with the electric heating strip 51 after the upper cover 12 and the base are closed, so that the opening of the packing bag 21 at this position is melt and sealed; and, a notch-cutting component 60 (as shown in FIGS. 2 to 4 and FIGS. 8 to 9) is used to cut a notch on the edge 210 of the packing bag 21 near to the sealing position. The notch-cutting component 60 is configured inside the base 11 and is located at a position corresponding to the lifting end of the upper cover 12. A frame 61 is provided. The center of the frame 61 is pivoted with the base 11 via a pivot shaft 62, and the left and right ends have a first end 610 and a second end 611. A notch-cutting knife 63 is provided. The notch-cutting knife 63 is fixed on the top surface of the first end 610 of the frame 61. A spring 64 is provided, being a compression spring configured on the first end 610. One end is fixed with the frame 61, while the other end is fixed with the base 11. The spring 64 can exert a force to push the first end 610 of the frame 61 and the notch-cutting knife 63 downward. The top wall of the base 11 is configured with a knife dispensing opening 13 at the position corresponding to the notch-cutting knife 63. The top wall of the base 11 has an opening 14 at the position corresponding to the top of the second end 611. The bottom surface of the upper cover 12 is configured with a downward-extending push rod 15 at the position corresponding to the opening 14. When the upper cover 12 is pressed down to close the base 11, the bottom end of the push rod 15 passes through the opening 14 and presses the second end 611 to move downward, so that the frame 61 is turned around the pivot shaft 62 and the first end 610 and the notch-cutting knife 63 are moved upward. Meanwhile, the notch-cutting knife 63 is extended out of the top surface of the base 11 (see FIG. 9) via the knife dispensing opening 13. Thus, when the upper cover 12 is pressed down to close the base 11 and seal the packing bag 21, the notch-cutting knife 63 will move upward and cut out a notch on the edge 210 of the packing bag 21 beyond the packing range, so that the bag can be torn open from the notch. Based on the above configuration, when the upper cover 12 is not closed (as shown in FIG. 8), the notch-cutting knife 63 is hidden inside the base 11, and the sealing machine can be operated more safely.

After sequential assembly of the above components, the applications are as following:

1. Open the upper cover 12 and put the packing bag roll 2 having edges 210 on both sides into the placing groove 20 (as shown in FIG. 5). Then, pull the end part of the packing bag roll 2 upward, lift the bag-cutting frame 30 so that the end part of the packing bag 21 passes through the lower part of the bag-cutting frame 30, and pull out the packing bag for the required length. Then, press down the bag-cutting frame 30 to activate the sliding block 34 to drive the cutter 35 to cut (as shown in FIG. 6). After the cutting, the packing bag 21 is separated from the packing bag roll 2 and ready to be filled with products.

Figure 7:
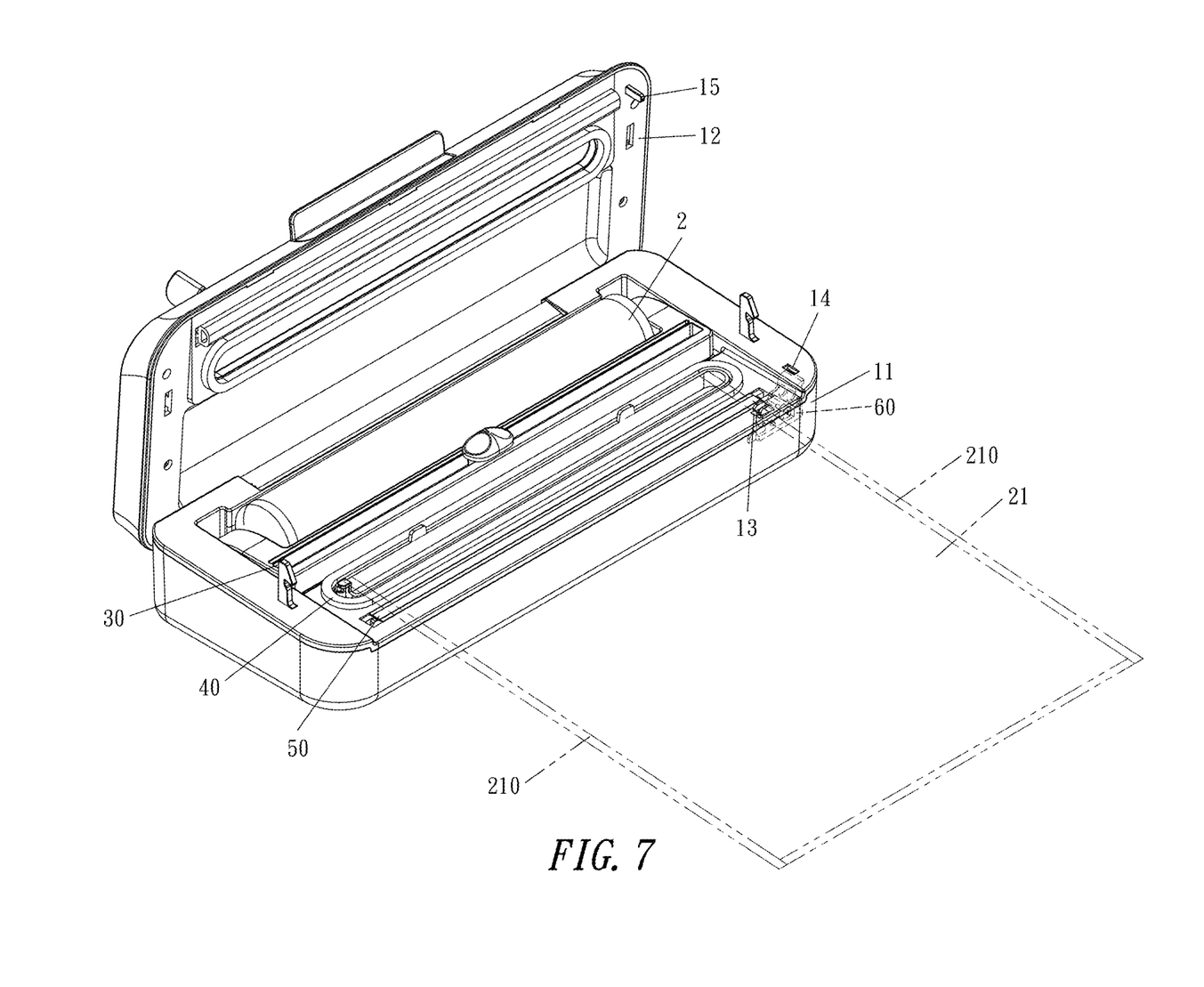
FIG. 7 is a status view of an embodiment of the present invention showing placement of the packing bag before vacuum pumping, sealing and notch-cutting.
Figure 9:
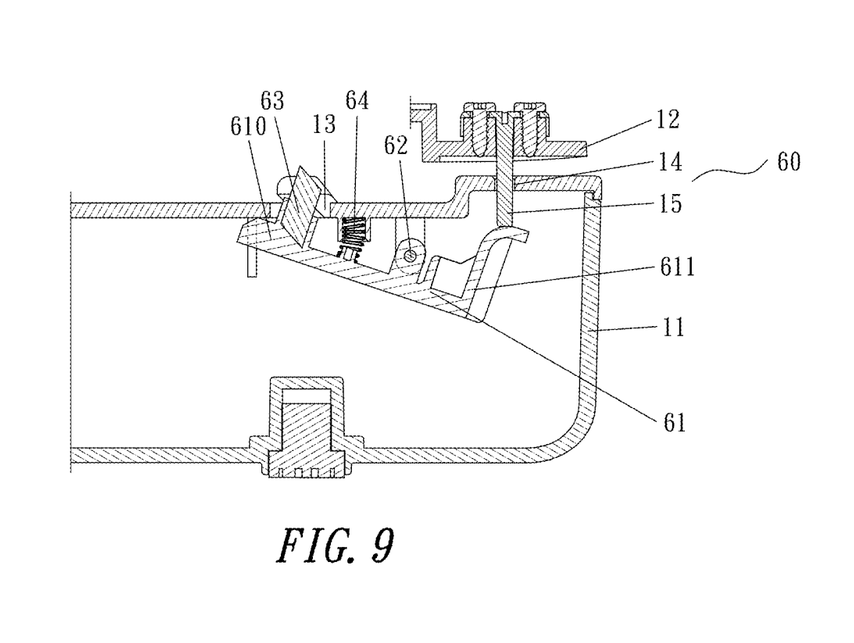
FIG. 9 is a structural view of the notch-cutting component of an embodiment of the present invention after the upper cover is put down.

2. After the packing bag 21 is filled with products and ready for vacuum pumping and sealing, place the opening of the packing bag 21 at the position of the vacuum pumping slot 41 of the vacuum pumping component 40, with the edge 210 of the packing bag 21 positioned at the opening 14 (as shown in FIG. 7). After pressing down the upper cover 12 to close the base 11, and the vacuum pumping component 40 is started, the vacuum pump 42 will start vacuum pumping to suck out the air inside the packing bag 21. After the sealing component 50 is started, the electric heating strip 51 and the pressing strip 52 will start to heat and seal the opening of the packing bag 21. When the upper cover 12 is pressed down to close the base 12, the bottom end of the push rod 15 passes through the opening 14 and presses the second end 611 to move downward, so that the frame 61 is turned around the pivot shaft 62 and the first end 610 and the notch-cutting knife 63 are moved upward (as shown in FIG. 9), and the notch-cutting knife 63 is extended out of the top surface of the base 11 via the knife dispensing opening 13. Thus, a notch is cut out on the edge 210 of the packing bag 21, to facilitate opening of the packing bag 21 from the notch.

According to the above descriptions, in the notch-cutting component 60 of the present invention, before the upper cover 12 closes the base 11, the notch-cutting knife 63 is hidden inside the base 11. In this way, when pulling the packing bag 21 or placing the packing bag 21 on the base 11 for vacuum pumping and sealing, the hand of the user will not be hurt by the notch-cutting knife 63 and the machine can be operated safely.

What is claimed is:

1. A sealing machine with notch-cutting function, wherein a body of the sealing machine comprises:
   a base;
   an upper cover located above the base, one end of the upper cover being pivotable relative to the base, wherein the upper cover is able to close the base;
   a sealing component configured between the base and the upper cover to seal a packing bag;
   a notch-cutting component configured to cut a notch on an edge of the packing bag near a sealing position of the packing bag, wherein the notch-cutting component comprises a frame, a center of the frame pivoting relative to the base via a pivot shaft and left and right ends of the frame being first and second ends, respectively, a notch-cutting knife being fixed on a top surface of the first end; and a spring having one end that is fixed to the frame and another end that is fixed to the base, the spring exerting a force to push the first end and the notch-cutting knife downward, a top wall of the base comprising a knife dispensing opening at a position corresponding to the notch-cutting knife, the top wall of the base comprising a second opening at a position corresponding to a top surface of the second end, a bottom surface of the upper cover protruding downward to form a top rod at a position corresponding to the second opening, wherein when the upper cover faces downward to cover the base, a bottom end of the top rod passes through the second opening to press the second end and move the second end downward, thereby causing the frame to pivot about the pivot shaft to cause the first end and the notch-cutting knife to move upward and cause the notch-cutting knife to pass through the knife dispensing opening to extend above a top surface of the base.

2. The sealing machine with notch-cutting function of claim 1, wherein the spring is a compression spring and is disposed on the top surface of the first end.

3. The sealing machine with notch-cutting function of claim 1, wherein the sealing component comprises an electric heating strip on the top surface of the base and can set up a heat temperature, after being started, at a position corresponding to the electric heating strip, the bottom surface of the upper cover comprises a pressing strip, the pressing strip can be pressed and connected to the electric heating strip when the upper cover closes the base, and thus an opening of the packing bag can be heated and sealed.

4. The sealing machine with notch-cutting function of claim 1, wherein: the sealing machine is a vacuum sealing machine; the sealing machine further comprises a vacuum pumping component; the vacuum pumping component comprises a vacuum pumping slot on each of the top surface of the base and the bottom surface of the upper cover; a periphery of each vacuum pumping slot comprises a seal ring; after the upper cover closes the base, the vacuum pumping slots form a sealed space; a vacuum pump is mounted inside the base; a suction opening of the vacuum pump is connected to one of the vacuum pumping slots; and after starting, the vacuum pump can suck air out of an opening of the packing bag placed inside the one of the vacuum pumping slots, thus forming a vacuum inside the packing bag.

5. The sealing machine with notch-cutting function of claim 4, wherein the sealing machine further comprises a placing groove configured on the base for placing a packing bag roll, and a bag-cutting frame having left and right ends respectively extending to form left and right arms, end parts of the left and right arms are pivoted relative to left and right walls of the placing groove, a connecting arm is configured between the left arm and the right arm, a center of the connecting arm comprises a sliding slot with an open shape for embedding a sliding block, the sliding block can slide left and right along the sliding slot, and a bottom surface of the sliding block comprises a cutter.

\* \* \* \* \*